May 24, 1932.  J. D. KARLE  1,859,334
CENTRIFUGAL CLUTCH
Filed July 9, 1930

Inventor
John D. Karle
By
Henry J. Miller
Attorney

Witness:
Godfrey Peine

Patented May 24, 1932

1,859,334

UNITED STATES PATENT OFFICE

JOHN D. KARLE, OF ROSELLE PARK, NEW JERSEY, ASSIGNOR TO THE SINGER MANUFACTURING COMPANY, OF ELIZABETH, NEW JERSEY, A CORPORATION OF NEW JERSEY

CENTRIFUGAL CLUTCH

Application filed July 9, 1930. Serial No. 466,711.

This invention relates to centrifugal clutches or speed-responsive devices for establishing driving relation between a source of power and a driven element. The invention has for an object to provide a simplified and improved clutch of this character.

The invention consists in the devices, combinations and arrangements of parts hereinafter described and claimed.

Figure 1:
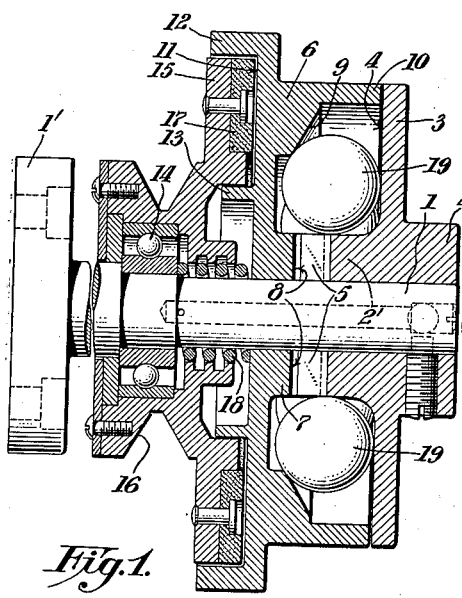
Figure 2:
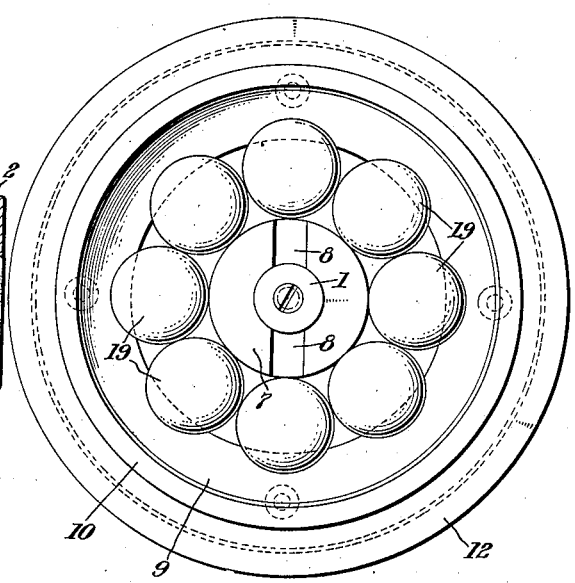
Figure 3:
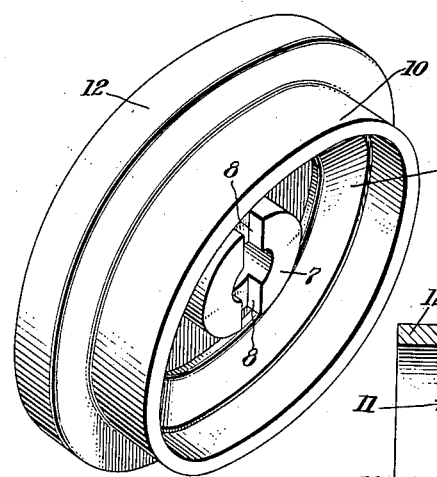
Figure 5:
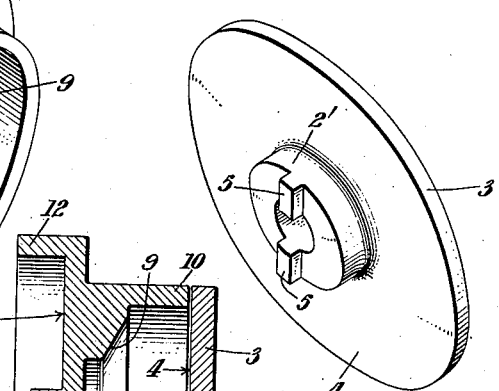
Figure 4:
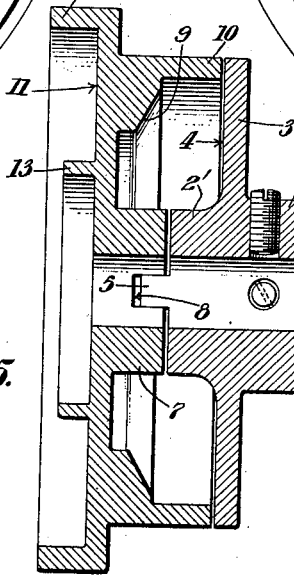

The features of the invention and the advantages attained thereby will be best understood from the following detailed description of a preferred embodiment thereof illustrated in the accompanying drawings, of which Fig. 1 is a longitudinal sectional view of the clutch. Fig. 2 is a view looking endwise of the driving shaft, with the outer ball-engaging plate removed. Fig. 3 is a perspective view of the movable driving clutch-member showing the ball-race therein. Fig. 4 is a perspective view of the fixed driving clutch-member and ball-engaging plate, and Fig. 5 is a section similar to that shown in Fig. 1 but taken in a plane at right angles to the plane of the section of Fig. 1.

Reference numeral 1 represents a driving shaft which may be formed at one end with a flange 1' for attachment to the rotary element of an electric motor or other source of power. Fixed to the outer end of the shaft 1 is a fixed driving clutch-member 2 having an internal hub 2' and a flange 3 formed with a ball-engaging face 4 which is disposed in a plane transverse to the shaft 1. The hub 2' of the fixed driving clutch-member is formed with rib-sections 5 disposed preferably diametrically of the hub 2'.

Mounted to slide upon the shaft 1 is a movable driving clutch-member 6 having an internal hub-portion 7 formed with diametrical slot-sections 8 which receive the rib-sections 5. The movable clutch-member 6 is also formed with a conical ball-race 9, an outer cylindrical guard flange 10, a flat clutch-face 11, and outer and inner clutch-face-shields 12, 13, respectively.

Mounted in a fixed operative position on the shaft 1, on the ball-bearing 14, is the driven clutch-member 15 having a belt-groove 16 and a friction facing 17 adapted for friction driving engagement with face 11 of the movable clutch-member 6. The spring 18, disposed on the shaft 1 between the ball-bearing 14 and the movable clutch-member 6, urges the latter away from the driven clutch-member 15. A series of ball weights 19 is disposed in the ball-race between the conical face 9 and the flat ball-engaging face 4.

When the shaft 1 is started, the clutch-members 6 and 15 are out of driving engagement with one another and the balls 19 are close to the hub 2'. When the speed of the shaft 1 increases to a predetermined value, the centrifugal force exerted by the balls upon the movable clutch-member 9, overcomes the resistance of the spring 18 and moves the clutch-member 6 into driving engagement with the friction facing 17 on the clutch-member 15.

The rib-and-slot key-connection 5, 8, between the members 2 and 7 transmits a driving torque from the fixed member 2 to the movable clutch-member 6 and operates quietly and without back-lash in all positions of the movable clutch-member. The balls 19 are initially gripped by the faces 4, 9 and the hub 2', Fig. 1; the members 2 and 6 being slightly separated when the balls are in their extreme inner positions. The ball-race is devoid of pockets or partitions to fix the balls which are free to shift their operative positions and distribute evenly over the members 3 and 6 such wear as they may cause.

Having thus set forth the nature of the invention, what I claim herein is:—

In a centrifugal clutch, a driving shaft, a driving member fixed to said shaft and having a hub, a movable clutch-member slidable on said shaft and having a hub, a diametrical rib-and-slot key-connection between said hubs, said members having between them a centrifugal weight receiving cavity with a series of centrifugal weights in said cavity, said cavity having walls against which said centrifugal weights react in their outward movement to slide said movable clutch-member on said shaft, a driven clutch-member journaled on said shaft at the side of the movable clutch-member remote from the first mentioned driving member, and a spring between said driven and movable members.

In testimony whereof I have signed my name to this specification.

JOHN D. KARLE.